March 17, 1936. H. D. STEVENS 2,034,642
TIRE BUILDING APPARATUS
Filed Jan. 22, 1934   4 Sheets-Sheet 1

INVENTOR
HORACE D. STEVENS
BY Ely & Barrow
ATTORNEYS

March 17, 1936.  H. D. STEVENS  2,034,642
TIRE BUILDING APPARATUS
Filed Jan. 22, 1934    4 Sheets-Sheet 2
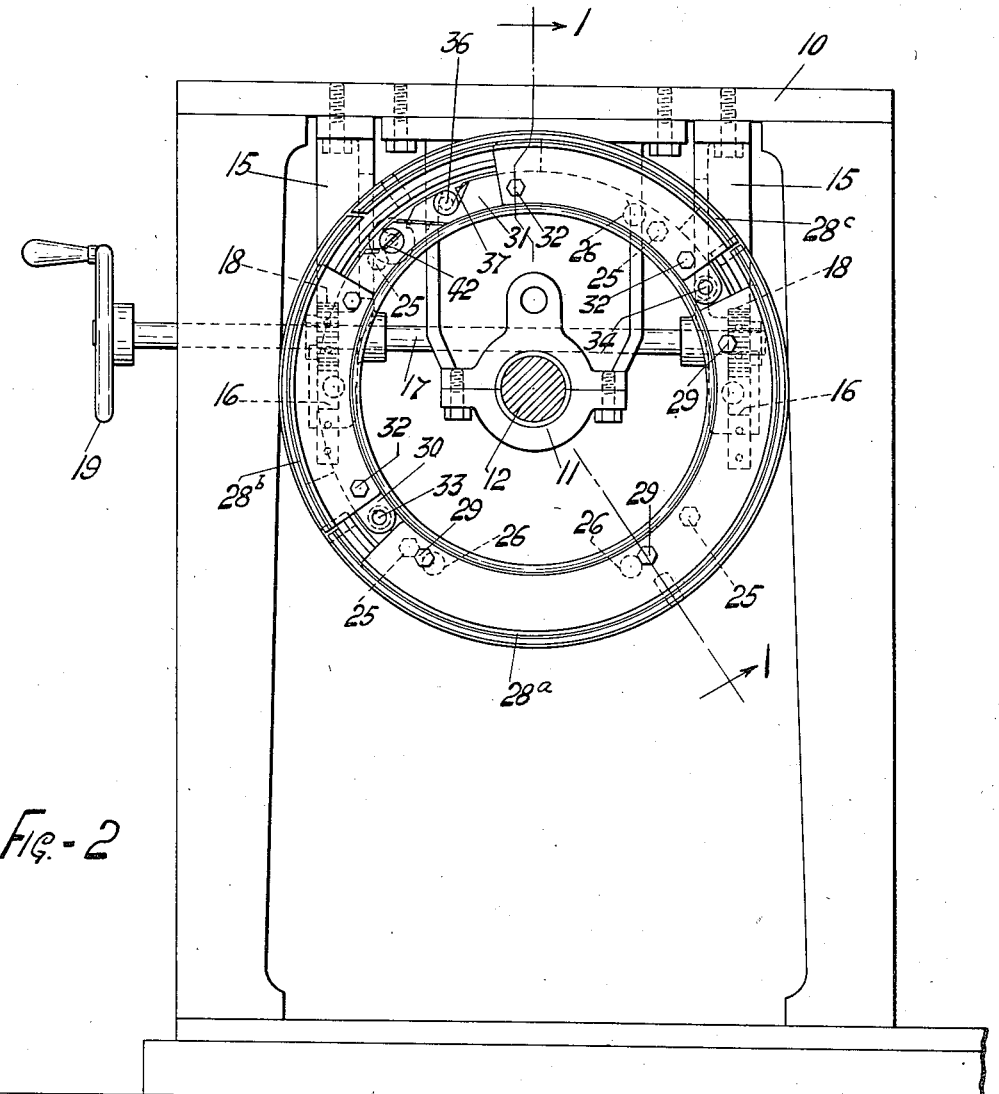
Fig.-2
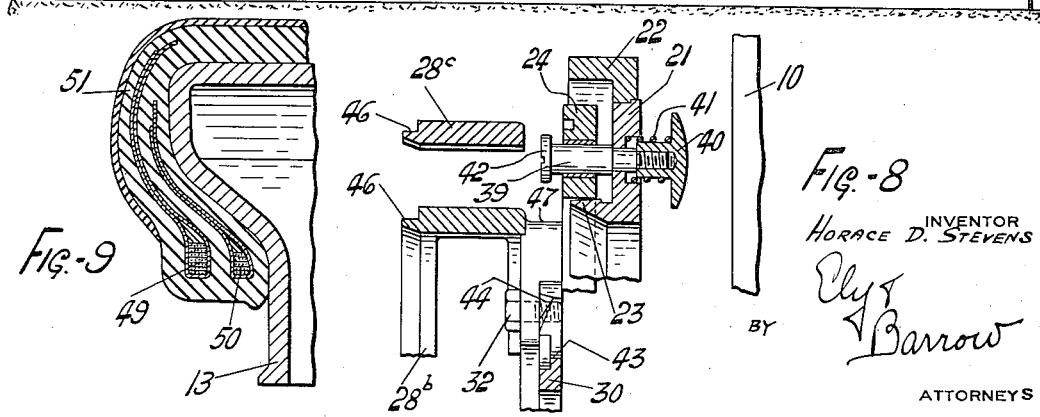
Fig.-9
Fig.-8
INVENTOR
HORACE D. STEVENS
BY Barrow
ATTORNEYS March 17, 1936.  H. D. STEVENS  2,034,642

TIRE BUILDING APPARATUS

Filed Jan. 22, 1934  4 Sheets-Sheet 3

INVENTOR
HORACE D. STEVENS

BY Barrow

ATTORNEYS

March 17, 1936.  H. D. STEVENS  2,034,642
TIRE BUILDING APPARATUS
Filed Jan. 22, 1934   4 Sheets-Sheet 4

INVENTOR
HORACE D. STEVENS
BY Ely & Barrow
ATTORNEYS

Patented Mar. 17, 1936

2,034,642

UNITED STATES PATENT OFFICE 2,034,642

TIRE BUILDING APPARATUS

Horace D. Stevens, Akron, Ohio, assignor to The Firestone Tire & Rubber Company, Akron, Ohio, a corporation of Ohio Application January 22, 1934, Serial No. 707,660

11 Claims. (Cl. 154—9)

This invention relates to tire building apparatus, and more especially it relates to bead placing rings such as are used in connection with tire building machines for mounting the bead or beads at least on one side of a pneumatic tire casing during the fabrication thereof.

In the building of pneumatic tire casings upon cores or drums that are supported upon rotatable axial spindles, it is necessary to pass the bead or beads to be applied to one side of the tire over the core or drum while the latter is collapsed. It is customary to mount such a bead on a suitable bead-placing ring which subsequently is moved into juxtaposition with the side of the tire to apply said bead thereto. The present invention is of primary utility in the manufacture of large heavy tires such as have respective bead regions each comprising two, spaced-apart bead cores.

The chief objects of the invention are to provide conveniently for supporting two tire beads at one side of a tire building form; to provide a bead-placing structure for tire machines having means for supporting two tire beads; and to provide a bead-placing structure wherein the second bead is easily and quickly moved into position to be applied to a tire after the first bead has been applied thereto. Other objects will be manifest.

Of the accompanying drawings;

Figure 2 is a section on the line 2—2 of Figure 1 showing the bead-placing ring in front elevation, the beads being omitted;

Figure 7 is a fragmentary sectional view of the bead-placing structure as it appears while placing the second tire bead on a tire in course of construction;

Figure 8 is a section on the line 8—8 of Figure 5; and

Figure 9 is a fragmentary sectional view of a finished tire showing two bead cores in place in one of the beads thereof.

Figure 1:
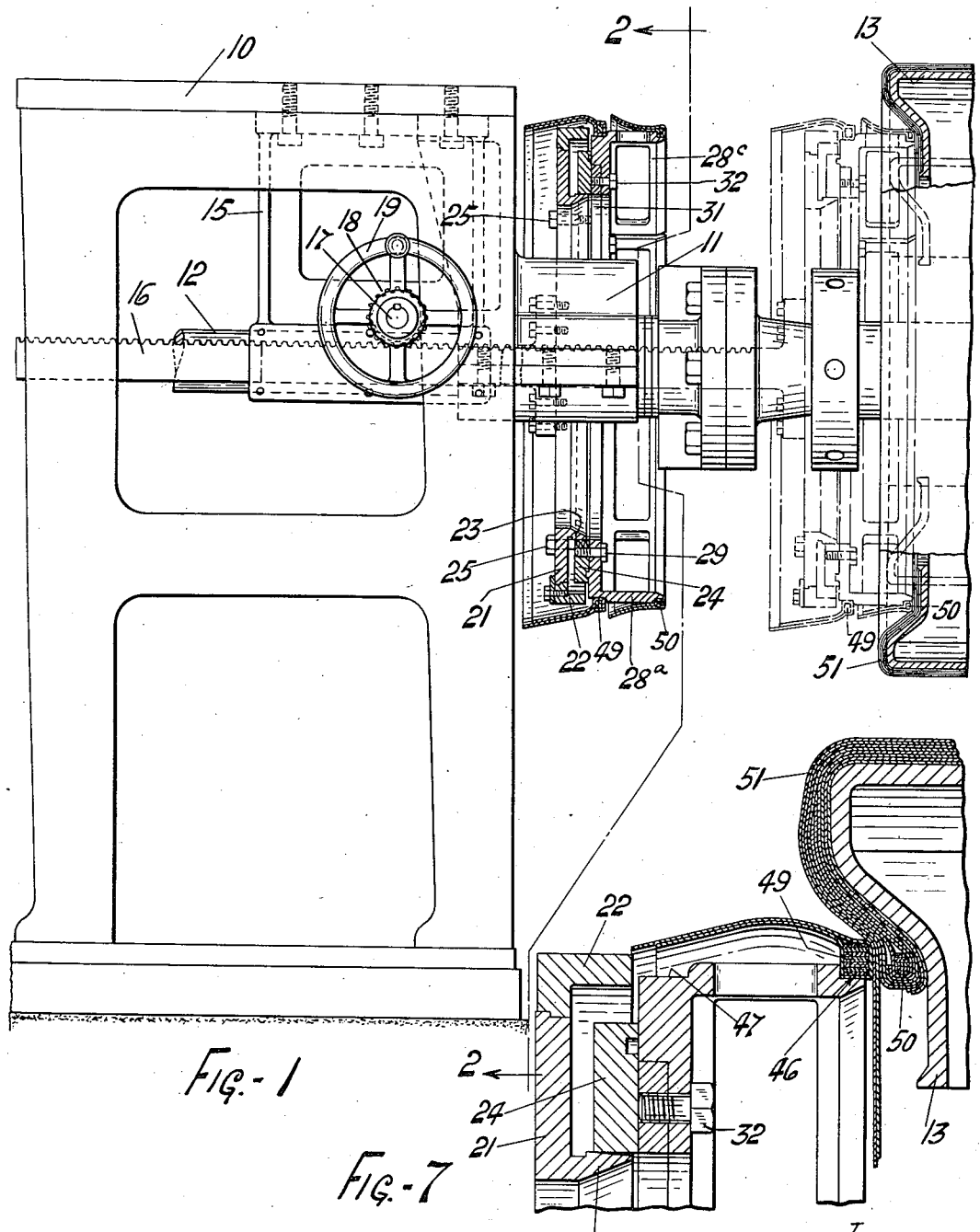
Figure 1 is a side elevation of a tire building machine and the work thereon, and the improved bead-placing ring embodying the invention operatively associated therewith, said bead-placing ring being shown in section on the line 1—1 of Figure 2.

Referring to the drawings, the tire building machine comprises a frame or housing 10 provided with bearings, such as the bearing 11, for a rotatable spindle 12 that projects from one side of the frame 10 and has a tire building form or drum 13 mounted upon its free end. Means (not shown) is provided for driving the spindle 12 in the usual manner. The form 13 is a collapsible drum that is flat on its outer periphery and is formed with inwardly extending lateral flanges that are undercut as shown, whereby the respective beads of a tire built thereon will be disposed substantially in the same positions they occupy in the finished tire that has been shaped to the usual tire form with rounded crown. This shape of drum is especially advantageous in the manufacture of heavy tires that have two or more bead cores in each bead, since said bead cores are incapable of relative movement after they are mounted in the tire.

Mounted within the frame 10, at opposite sides of the spindle 11, are respective brackets 15, 15 each comprising a slideway for a rack 16. Said brackets also comprise journals for a shaft 17 that carries pinions 18, 18 that mesh with the respective racks 16. One end of shaft 17 extends beyond one side of frame 10 and is provided with a handwheel 19. The arrangement is such that the racks 16 may be manually reciprocated toward and away from the drum 13.

Mounted upon the ends of the racks 16 adjacent the drum 13 is a bead-placing structure comprising an annular ring or holder 21 to the outer periphery of which is attached an annular backing ring 22 that projects laterally of holder 21 toward the drum 13. The inner periphery of holder 21 is formed with a flange 23 that projects laterally toward the said drum, said flange having its outer peripheral face slightly arcuate in a transverse direction.

Mounted upon the outer periphery of flange 23 is an annular plate or flange 24, the front face of which extends slightly beyond the front edge of backing ring 22, its rear face being in spaced relation to holder 21. The flange 24 is retained in place by bolts 25, 25 extending freely through holder 21, and a plurality of yielding rubber spacers or bumpers 26, 26 are positioned between the flange and holder, the arrangement being such as to permit limited axial movement of the flange with relation to the holder. The flange 24 carries a sectional collapsible bead-placing ring of which 28a is the fixed section and 28b, 28c are the respective movable sections. The fixed section 28a is secured directly to flange 24 by bolts 29, 29. The movable sections 28b, 28c are secured to respective hinge arms 30, 31 by bolts 32, 32, said hinge arms being pivotally mounted on respective hinge pins 33, 34 carried by the flange 24, the free ends of said arms being adjacent each other and complementally beveled as shown to permit of movement relatively of each other.

Figure 3:
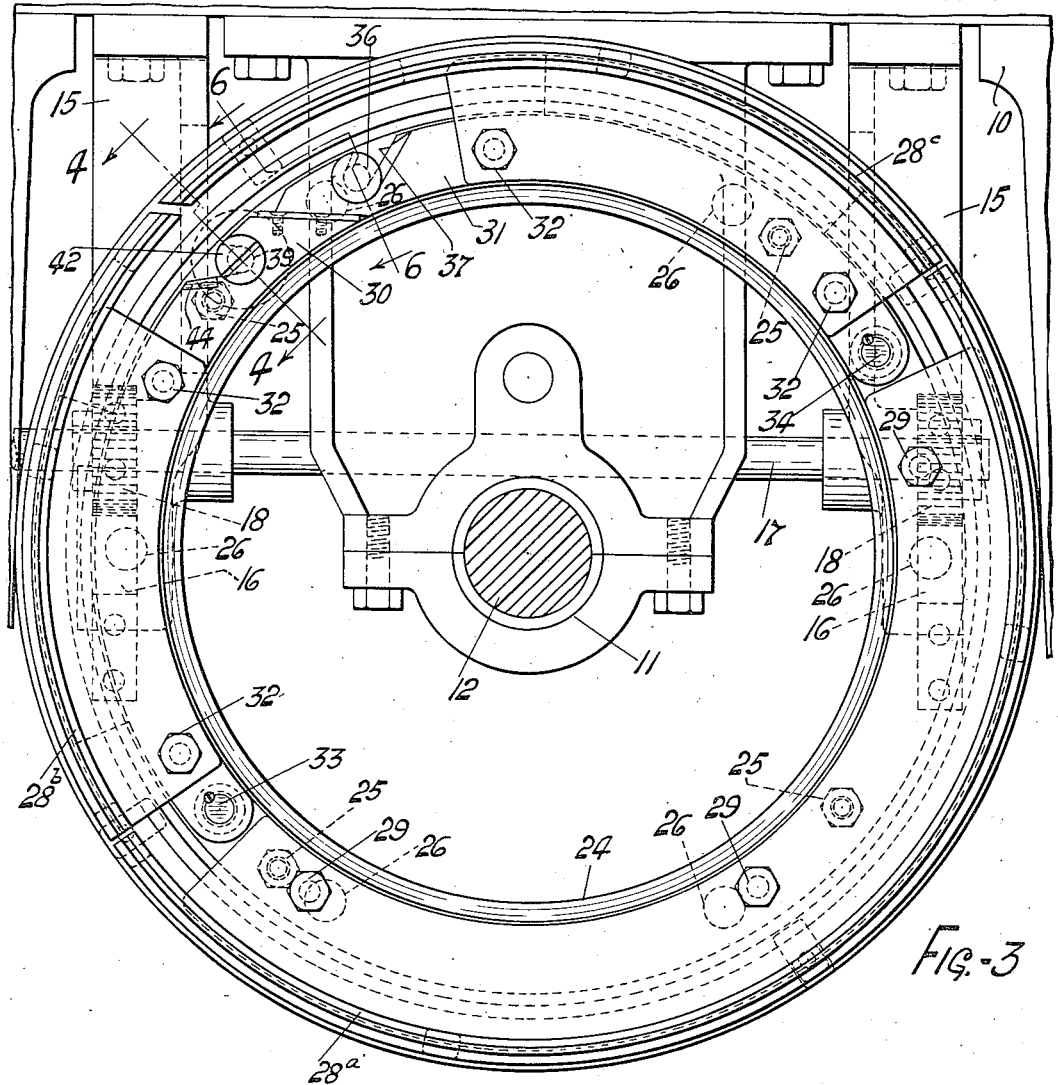
Figure 3 is a view of a portion of the apparatus shown in Figure 2, on a larger scale.
Figure 4:
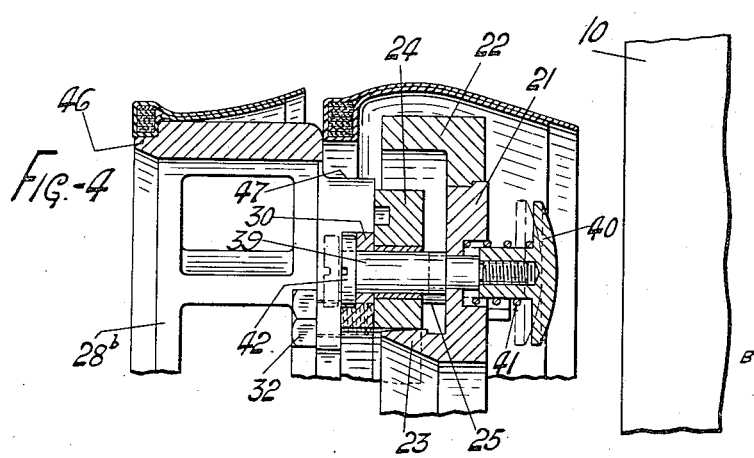
Figure 4 is a section on the line 4—4 of Figure 3.

The operative angular position of the arm 31 is determined by a flanged stud or stop pin 36 mounted in and projecting forwardly from the flange 24. The free end portion of the arm 31 is formed with a notch 37 that is concentric with hinge pin 34 and opens onto the outer peripheral margin of said arm, said notch embracing said stud when the arm is in the operative positions shown in Figures 2 and 3, but permitting the arm to swing inwardly as shown in Figure 5.

The arm 31 is retained in operative position by the arm 30 by reason of the angle of the bevel on their free ends. For retaining the arm 30 in operative position there is provided a locking pin 39 that is slidably mounted in the flange 24 and extends through the holder 21, being provided with a handle or knob 40 on the end thereof that extends through said holder. A compression spring 41 is mounted on the said pin between the holder and the knob 40 with the result that the opposite end of the pin normally is urged toward the flange 24. Said opposite end of the pin is formed with an enlarged head or flange 42. The free end of arm 30 is formed on its outer peripheral margin with a notch 43 that is concentric with hinge pin 33. The arrangement is such that in the operative position of arm 30 the notch 43 embraces the pin 39, and head 42 is pressed against the said arm by spring 41 so as frictionally to retain the arm in position. The notch 43 may be beveled as shown at 44 to facilitate engagement with the pin 39.

The front or free margin of the sectional bead-placing ring is formed, at its outer periphery, with a circumferential groove 46 in which a tire bead may be positioned, the width of said groove being such that a bead placed thereon will extend slightly beyond the front of the ring. The rear marginal portion of the sectional bead-placing ring is formed with a circumferential groove 47 which is substantially of the same diameter as the groove 46 on the front of the ring, but may be wider than the latter. The front face of backing ring 22 provides a rear abutment for a tire bead mounted in groove 47. Portions of the rear edges of the movable ring sections 28b, 28c are cut away as shown so that the groove 47 is not continuous, but is sufficiently so to support a bead placed therein.

Figure 5:
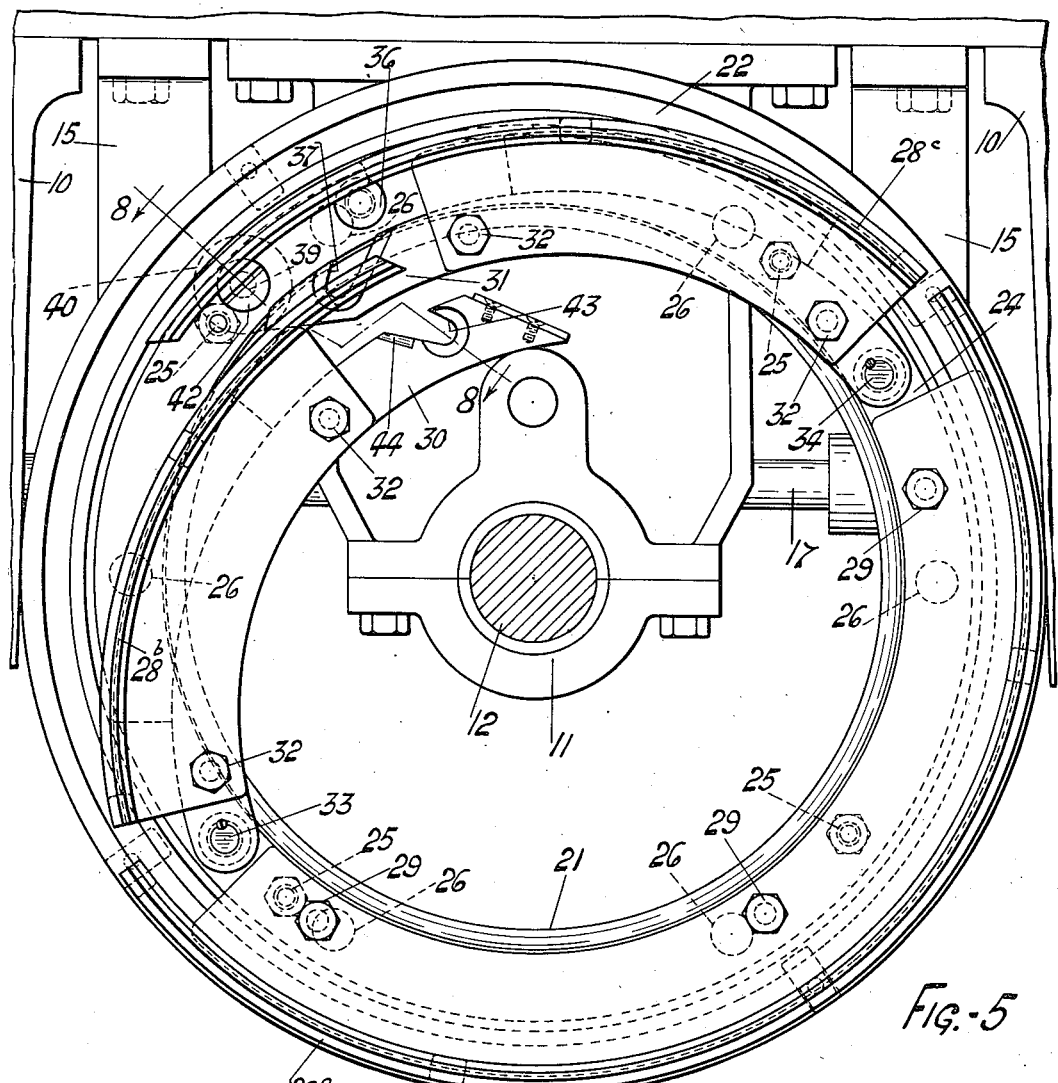
Figure 5 is a view similar to Figure 3 showing how the bead-placing structure is partly collapsed to receive one of the tire beads.
Figure 6:
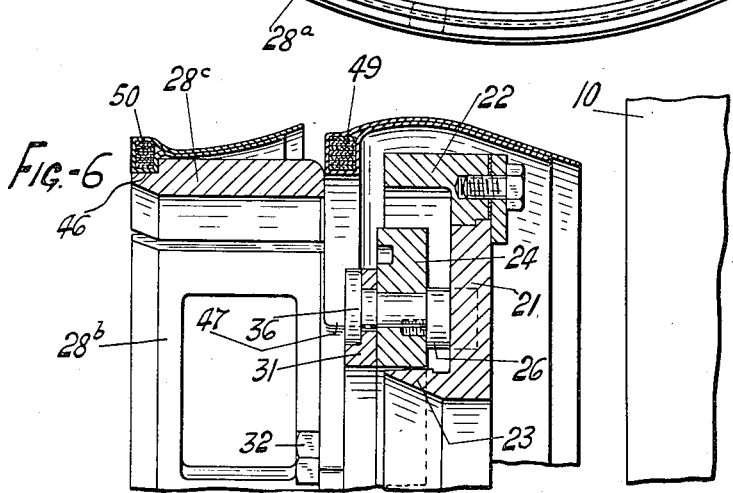
Figure 6 is a section on the line 6—6 of Figure 3, on a larger scale, and showing two tire beads in position on the structure.

In the operation of the apparatus, the drum 13 is collapsed in the usual manner, and the movable sections 28b, 28c of the bead-placing ring are collapsed, as shown in Figure 5. Two tire beads 49, 50 are then passed in succession over the collapsed drum. The bead 49, which is the last to be applied to the tire to be built, is of the same inside diameter as the bead 50, but may differ from the latter in other respects. The bead 49 is then placed in the groove 47 of the collapsed bead-placing ring, after which the latter is expanded to operative position by swinging its movable sections outwardly to the operative position shown in Figures 1, 2 and 3, the latching pin 39 retaining them in this position. The bead 50 is then mounted in groove 46 of the bead-placing ring, as shown in Figures 1 and 6, after which the drum 13 is expanded to operative position and the building of a tire thereon commenced. The tire in its various stages of completion is designated 51.

After the first under-bead fabric plies have been applied to the drum 13, the handwheel 19 is rotated to move the bead-placing structure forward to the position shown in broken lines in Figure 1, whereby the tire bead 50 is pressed against the tire structure and adhesively attached thereto. The bead-placing structure is then returned to the full line position of Figure 1 and the collapsible ring sections 28b, 28c moved inwardly to the position shown in Figure 5. This permits the bead 49 to be removed from its groove 47. The ring sections 28b, 28c are then swung back to their original positions and the bead 49 is mounted in groove 46 of the ring. More fabric plies are then applied to the drum 13 and after the requisite number are mounted thereon, the bead-placing structure is again moved forward in the manner hereinbefore described so that the bead 49 is applied to the tire structure, as is most clearly shown in Figure 7.

After the bead-placing structure is again retracted to inoperative position, the tire 51 may be completed in the usual manner, the finished tire being shown in Figure 9. The drum 13 is then collapsed to remove the finished tire, which completes the cycle of operation.

Any preferred or known means may be used for placing the tire beads on the opposite side of the tire, since that side of the tire is unobstructed by the spindle 12 and presents no problem such as is present at the rear of the tire.

Because of the resilient mounting of the flange 24, the bead-placing ring will be slightly yielding in an axial direction so that it will not damage the tire structure 51 if moved forcibly thereagainst. Because the flange 23 is slightly arcuate on its outer surface, the bead-placing ring may tilt slightly and thus compensate for irregularities in the said tire structure.

The apparatus makes for facile and expeditious manufacture of large tires having dual beads, and achieves the several objects set out in the foregoing statement of objects.

Modification may be resorted to without departing from the spirit of the invention or the scope of the appended claims.

What is claimed is:

1. In tire building apparatus the combination of a tire building form, a sectional, coaxially disposed, collapsible bead-supporting ring, and means for moving said ring toward and away from said form.

2. In tire building apparatus the combination of a tire building form, an annular supporting ring co-axially arranged at one side thereof, means for moving said ring toward and away from said form, and a sectional bead-supporting structure carried by said ring.

3. In tire building apparatus, the combination of a rotatable tire building form, a coaxial collapsible ring at one side thereof, said ring being formed with a plurality of circumferential grooves in which respective tire beads may be mounted, and means for moving said ring toward and away from the tire building form.

4. In a structure for mounting tire beads on tires during the manufacture thereof, the combination of an endless supporting ring, and a sectional bead-placing ring mounted on one side thereof, one of the ring sections being fixedly mounted and two of the ring sections being pivotally mounted to permit collapse of the ring.

5. In a structure for mounting tire beads on tires during the manufacture thereof, the combination of an endless supporting ring, a flange removably mounted on said supporting ring, and a sectional collapsible bead-placing ring mounted upon said flange.

6. In apparatus for mounting tire beads on tires during the manufacture thereof, the combination of an endless supporting ring, and a bead-placing ring carried thereby and having limited movement relative thereto, said bead-placing ring being sectional and collapsible.

7. In apparatus for mounting tire beads on tires, the combination of an endless supporting ring, and a concentric bead-placing ring carried thereby and having limited axial movement relative thereto, said bead-placing ring being sectional and collapsible.

8. In apparatus for mounting tire beads on tires, the combination of an endless supporting ring, and a concentric bead-placing ring carried thereby and having limited axial and tilting movement relative thereto, said bead-placing ring being sectional and collapsible.

9. In apparatus for mounting tire beads on tires, the combination of an endless supporting ring, a concentric, annular flange yieldingly mounted for axial movement on said supporting ring, and a sectional collapsible bead-placing ring mounted upon said flange.

10. In apparatus for mounting tire beads on tires, the combination of a supporting structure, an annular flange mounted thereon and having limited axial movement toward and away from said support, resilient spacer members between said flange and said support, and a sectional collapsible bead-placing ring concentrically mounted on said flange.

11. In apparatus for mounting tire beads on tires, the combination of a supporting structure, and a bead-placing ring yieldingly mounted thereon for limited movement relative thereto, said bead-placing ring being sectional and collapsible, and formed with a plurality of peripheral grooves for receiving respective tire beads.

HORACE D. STEVENS.